US012771641B2

(12) United States Patent
Roweth et al.

(10) Patent No.: US 12,771,641 B2
(45) Date of Patent: Oct. 20, 2026

(54) USE OF LINK UTILIZATION AS A LOAD METRIC

(71) Applicant: Hewlett Packard Enterprise Development LP, Spring, TX (US)

(72) Inventors: Duncan Roweth, Bristol (GB); Abdulla M. Bataineh, Vista, CA (US); Timothy J. Johnson, Sun Prairie, WI (US); David Charles Hewson, Bristol (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 99 days.

(21) Appl. No.: 18/893,164

(22) Filed: Sep. 23, 2024

(65) Prior Publication Data

US 2026/0089107 A1 Mar. 26, 2026

(51) Int. Cl.

| | |
|---|---|
| ***H04L 47/125*** | (2022.01) |
| ***G06F 15/16*** | (2006.01) |
| ***H04L 15/16*** | (2006.01) |
| ***H04L 43/0882*** | (2022.01) |
| ***H04L 45/24*** | (2022.01) |
| ***H04L 47/122*** | (2022.01) |

(52) U.S. Cl.

CPC ........ *H04L 47/125* (2013.01); *H04L 43/0882* (2013.01); *H04L 45/24* (2013.01); *H04L 47/122* (2013.01)

(58) Field of Classification Search

CPC ... H04L 47/125; H04L 43/0882; H04L 45/24; H04L 47/122

USPC .......................................................... 709/238

See application file for complete search history.

(56) References Cited

U.S. PATENT DOCUMENTS

| | | | | |
|---|---|---|---|---|
| 10,205,629 | B2 | 2/2019 | Ma et al. | |
| 11,165,676 | B1 | 11/2021 | Gandhi et al. | |
| 2003/0140124 | A1 | 7/2003 | Burns | |
| 2005/0060427 | A1 | 3/2005 | Phillips et al. | |
| 2006/0050634 | A1* | 3/2006 | Gous | H04L 43/0882 370/229 |
| 2006/0200731 | A1* | 9/2006 | Hepner | H03M 13/091 714/776 |

(Continued)

FOREIGN PATENT DOCUMENTS

| | | | | |
|---|---|---|---|---|
| EP | 2629490 | B1 * | 6/2015 | H04L 41/0668 |
| WO | WO-2004036814 | A2 * | 4/2004 | H04L 41/145 |

*Primary Examiner* — Berhanu Shitayewoldetsadik

(74) *Attorney, Agent, or Firm* — Yao Legal Services, Inc.

(57) ABSTRACT

A method, computer system, and computer-readable medium are provided which facilitate the use of link utilization as a load metric. The system monitors utilization of a plurality of links in a network. The system generates a link utilization load metric for a respective link of the plurality of links. The link utilization load metric for the respective link comprises an amount of data transmitted over the respective link in a most recent predetermined time period compared to a total available bandwidth of the respective link. The system receives data to be transmitted through the network. The system selects, from a set of valid paths, a path via which to forward the data based on a combination of the link utilization load metric for the respective link and a congestion metric associated with the respective link, causing a reduction in the number of flows to be rerouted.

20 Claims, 5 Drawing Sheets

(56) References Cited

U.S. PATENT DOCUMENTS

2009/0022056 A1* 1/2009 Ninan ..................... H04L 45/70 370/238
2009/0112899 A1 4/2009 Johnson
2009/0303882 A1* 12/2009 Tanaka .................. H04L 45/125 370/237
2011/0225288 A1 9/2011 Easterday et al.
2011/0291748 A1 12/2011 Li et al.
2012/0195204 A1* 8/2012 Patel ........................ G01V 1/28 370/237
2013/0322256 A1 12/2013 Bader et al.
2014/0119193 A1 5/2014 Anand et al.
2014/0198656 A1* 7/2014 Venkatesh ............... H04L 45/30 370/235
2015/0156127 A1 6/2015 Bello et al.
2016/0218963 A1* 7/2016 Nauck ................... H04L 45/123
2016/0352760 A1 12/2016 Mrkos et al.
2018/0098256 A1* 4/2018 Halepovic ............... H04L 43/08
2019/0372889 A1* 12/2019 Michael .............. H04L 41/0806
2019/0386913 A1* 12/2019 Wei ....................... H04L 47/125
2020/0007432 A1* 1/2020 McDonald ............ H04L 45/124
2020/0007435 A1* 1/2020 Paida .................... H04L 41/122
2020/0296026 A1* 9/2020 Michael .................. H04L 45/12
2020/0394073 A1 12/2020 Dutta et al.
2021/0297351 A1 9/2021 Vegesna et al.
2021/0352018 A1 11/2021 Liu et al.
2022/0150144 A1 5/2022 Gandhi et al.
2022/0210094 A1 6/2022 Bataineh et al.
2022/0311711 A1* 9/2022 Jepsen .................... H04L 47/27
2022/0321476 A1 10/2022 Williams et al.
2022/0400070 A1 12/2022 Jain et al.
2023/0198895 A1* 6/2023 Baniamerian ........... H04L 45/38 370/238
2024/0073124 A1* 2/2024 Dhamal Gopalarathnam ............ H04L 45/24
2024/0380636 A1 11/2024 Kazimirsky et al.
2026/0025426 A1 1/2026 Ye et al.
2026/0081859 A1 3/2026 Prashant

* cited by examiner

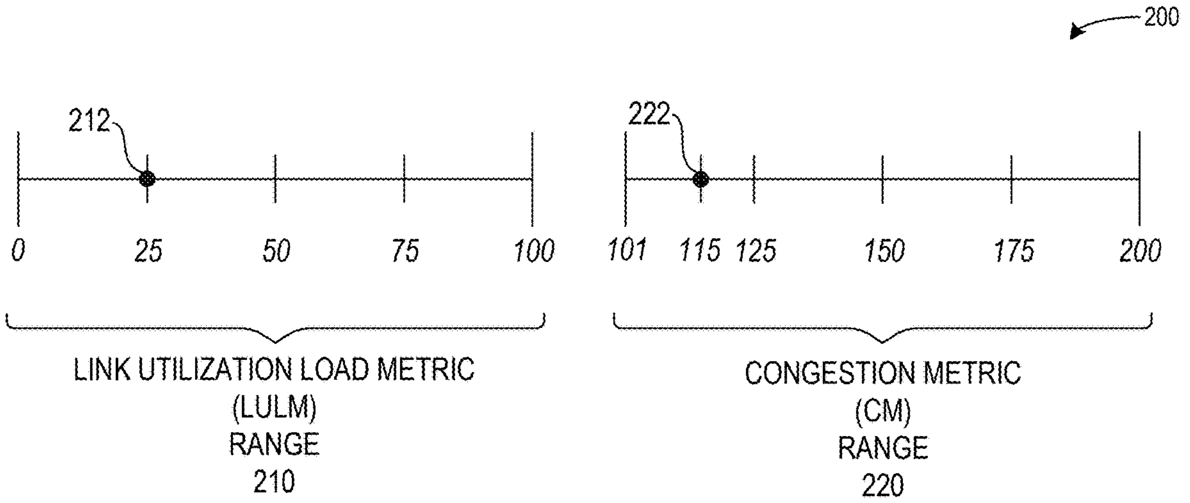

SAMPLE VALUES FOR SCENARIO:
FIRST PREDETERMINED THRESHOLD (PDT) FOR LULM = 25
SECOND PREDETERMINED THRESHOLD (PDT) FOR CM = 115
LULM = 5
CM = 106
FIRST WEIGHT (for LULM) X = 5
SECOND WEIGHT (for CM) Y = 2

230

240

| | CONDITION 242 | APPLICATION / DETERMINATION 244 | RESULT 246 |
|---|---|---|---|
| 250 | LULM < 1ST PDT | 5 ?< 25 | TRUE |
| 252 | LULM < 1ST PDT AND CM < 2ND PDT | 5 ?< 25 AND 106 ?< 115 | TRUE |
| 254 | ( LULM + CM ) < (1ST PDT + 2ND PDT ) | ( 5 + 106 = 111 ) ?< ( 25 + 115 = 140) [261] | TRUE |
| 256 | ( LULM*X + CM*Y ) < (1ST PDT*X + 2ND PDT*Y ) \| (1st PDT + 2nd PDT) \| (OTHER PDT) | ( 5*5 + 106*2 = 237 ) ?< ( 25*5 + 115*2 = 355) [262] \| 237 ?< 140 [264] \| 237 ?< 300 [266] | TRUE \| FALSE \| TRUE |
| 258 | ( LULM * CM ) < (1ST PDT * 2ND PDT ) | ( 5 * 106 = 530 ) ?< ( 25 * 115 = 2,875) [268] | TRUE |
| 260 | ( LULM*X * CM*Y ) < (1ST PDT*X * 2ND PDT*Y ) | ( 5*5 * 106*2 = 5,300 ) ?< ( 25*5 * 115*2 = 28,750) [270] | TRUE |

FIG. 2

USE OF LINK UTILIZATION AS A LOAD METRIC

STATEMENT OF GOVERNMENT-FUNDED RESEARCH

This invention was made with Government support under Contract number H98230-15-D-0022/0003 awarded by the Maryland Procurement Office. The Government has certain rights in this invention.

BACKGROUND

Path selection for data transmitted over links in a network may generally be based on a load metric, e.g., a congestion metric based on the depth of an output queue of a network device. A link which experiences bandwidth utilization (e.g., 50% of the available bandwidth) with no blocking in the output queues and no downstream congestion may appear not to be highly loaded. However, if a new flow is added to the link, the link may suddenly appear congested. Similarly, when a flow is removed from the link, the link may suddenly appear uncongested. The rapid spikes in load using only the congestion metric may cause a load balancing algorithm to perform unwanted and costly rerouting operations.

BRIEF DESCRIPTION OF THE FIGURES

FIG. 2 illustrates a diagram of an exemplary load metric including a combination of a link utilization metric and a congestion metric, in accordance with an aspect of the present application.

In the figures, like reference numerals refer to the same figure elements.

DETAILED DESCRIPTION

Figure 1:
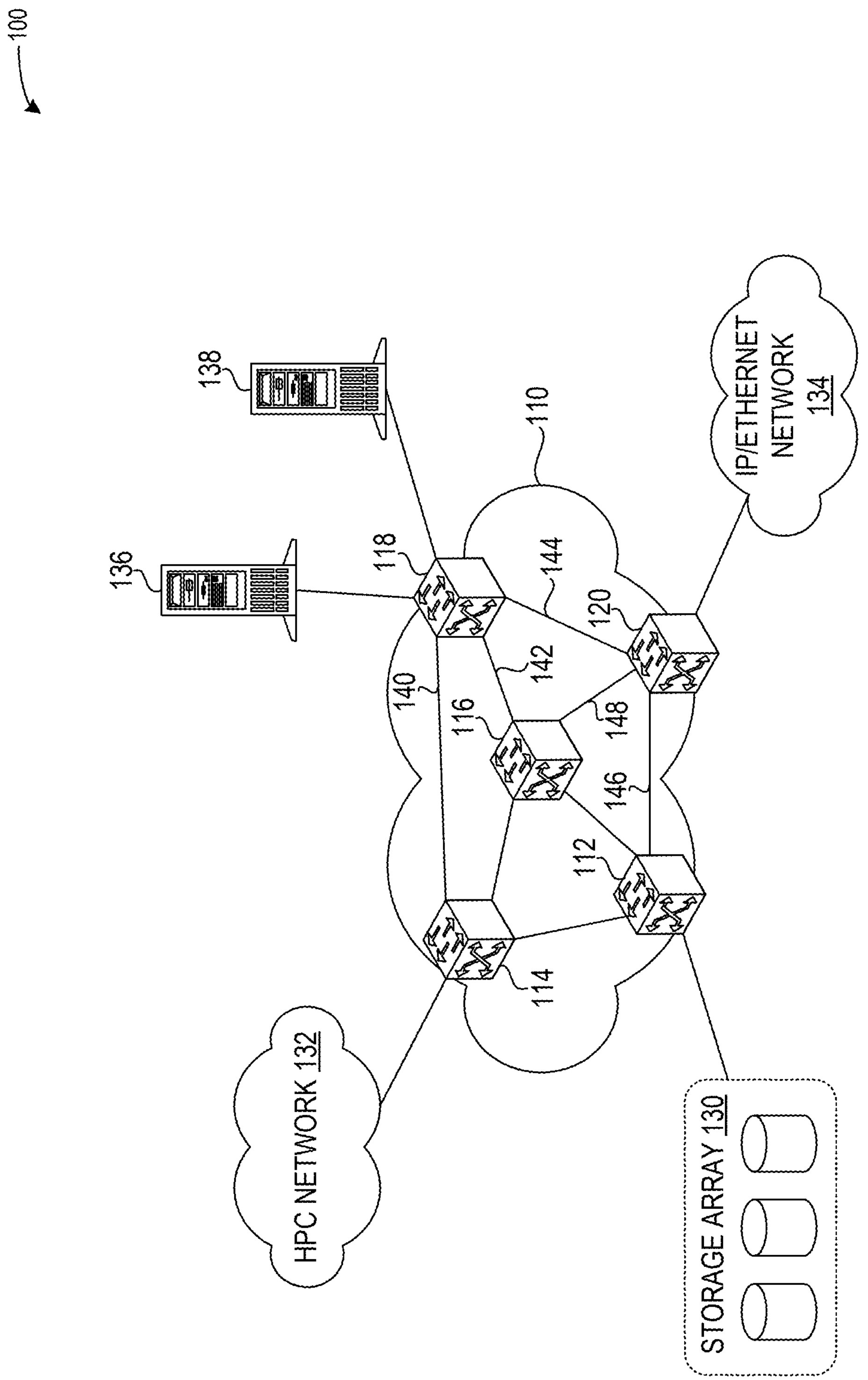
FIG. 1 illustrates an environment which facilitates the use of link utilization as a load metric, in accordance with an aspect of the present application.

Aspects of the present application provide a system which can improve load balancing by allocating traffic to paths based on a consideration of actual link utilization in addition to congestion metrics.

In general, systems and networks may select paths for traffic using a load metric based mainly on congestion, e.g., a congestion metric based on the depth of an output queue of a device in the network. In conventional methods and systems, a link which is experiencing no blocking in the output queues and causes no downstream congestion may be considered a "zero-load" link. Because conventional load metrics are based on congestion, this zero-load link may be selected because it does not indicate any blocking or congestion. However, the bandwidth used by this link (the "link utilization") may be very high. That is, a large amount of data may be passing through the link over a given period of time, in comparison to the total available bandwidth of the link. The link utilization may indicate a percentage of utilization and may be measured as an amount of data transmitted over a given link in a most recent predetermined time period compared to a total available bandwidth of the link. For example, the amount of data transmitted over a link in the past five seconds may be ten gigabits (Gb), which may be indicated as two Gb per second (Gbps). As another example, a 400 Gbps link transferring 400 Gb in ten seconds can result in a 10% utilization. A high utilization rate may be anything greater than a predetermined threshold, e.g., 75%.

As a result, adding another flow to a link with a high link utilization (but which is indicated as a zero-load link based only on congestion as the load metric) may result in a rapid or abrupt increase or spike in the load, which may cause a load-balancing algorithm to reroute one or more flows. In addition, removing a flow from the link may result in a sudden decrease in the load, which may also cause rerouting of one or more flows. Performing rerouting operations may impact performance and reduce overall efficiency.

The described aspects provide a system which can improve load balancing by allocating traffic based on actual link utilization in addition to conventional congestion metrics. The system can result in reducing the number of costly rerouting operations performed by a load-balancing algorithm, which can result in an increased performance and overall efficiency. Whereas the prior zero-load links account only for the congestion associated with the link, the described aspects can account for both the link utilization and the congestion, resulting in a finer granularity for defining the load metric. For example, previous methods for measuring load may not consider the percentage of link utilization and instead may only consider a congestion metric, e.g., an explicit congestion avoidance (ECA) value returned as part of an acknowledgment indicating congestion at an intermediate point in a network fabric. In the described aspects, the load metric may include a range of values for the link utilization, where each number may represent or indicate a percentage of utilization of the link. Thus, the described aspects can use a finer granularity for the load metric by accounting for both the link utilization metric and the conventional congestion metric in selecting paths over which to forward data. An exemplary load metric based on both the link utilization load metric and the congestion metric is described below in relation to FIG. 2.

FIG. 1 illustrates an environment 100 which facilitates the use of link utilization as a load metric, in accordance with an aspect of the present application. Diagram 100 can include a network 110 of switches which can be referred to as a "switch fabric" and can include switches 112, 114, 116, 118, and 120. Each switch can have a unique address or identifier within switch fabric 110. Various types of endpoints, processing nodes, devices, and networks can be coupled to a switch fabric. For example, a storage array 130 may be coupled to switch fabric 110 via switch 112; a high performance computing (HPC) network (e.g., InfiniBand, Slingshot, or any other high performance network) 132 may be coupled to switch fabric 110 via switch 114; a number of end hosts, such as hosts 136 and 138, may be coupled to switch fabric 110 via switch 118; and an Internet Protocol (IP)/Ethernet network 134 may be coupled to switch fabric 110 via switch 120. HPC network 132 may include multiple networked computer and storage devices concurrently running programs to complete different complex and performance-intensive tasks. IP/Ethernet network 134 may include physical Ethernet cabling and an application layer protocol between network devices based on IP, including communication via Transport Communication Protocol (TCP)/IP and User Datagram Protocol (UDP) packets.

In general, a switch can have edge ports and fabric ports. An edge port can couple to a device that is external to the fabric. A fabric port can couple to another switch within the fabric via a fabric link. Typically, traffic may be injected into switch fabric 110 via an ingress port of an edge switch and may leave switch fabric 110 via an egress port of another (or the same) edge switch. An ingress link can couple a NIC of an edge device (for example, an HPC end host) to an ingress edge port of an edge switch. Switch fabric 110 can then transport the traffic to an egress edge switch, which in turn can deliver the traffic to a destination edge device via another NIC. A packet can be forwarded in switch fabric 110 based on its Layer-2 address ("fabric address"), which may be viewed as an equivalent to a media access control (MAC) address in Ethernet. The forwarding path for the packet may be determined based on adaptive forwarding, e.g., based on local programming of the switches in switch fabric 110 and information related to load, traffic, and congestion available to and associated with switch fabric 110.

In some aspects, switch fabric 110 or HPC network 132 may include network devices (i.e., switches) which can perform load-balancing algorithms based on both link utilization and congestion metrics. The switches may monitor utilization of links in their respective network. For example, switch 118 may monitor utilization of links associated with its egress or ingress ports. Switch 118 may receive traffic which can be transmitted over valid paths, which may include a link 140, a link 142, or a link 144. Switch 118 can generate a "link utilization load metric" for each of links 140, 142, and 144. The link utilization load metric may be indicated by an amount of data transmitted over a respective link (e.g., 140, 142, or 144) in a most recent predetermined time period (e.g., 1 second) compared to a total available bandwidth of the link (e.g., 20 Gbps). Switch 118 may also monitor, receive, and store information associated with congestion related to monitored links 140, 142, and 144 (also referred to as a "congestion metric"). The congestion metric may be based on a depth of an output queue associated with a respective link (e.g., a number of packets waiting to be sent in an output buffer or queue associated with link 140, 142, or 144).

Switch 118 may receive data to be transmitted through switch fabric 110. Switch 118 may select, from a set of valid paths, a path via which to forward the data (e.g., via one of links 140, 142, or 144) based on a combination of the link utilization load metric and the congestion metric for a respective link. The values for the link utilization load metric may include a range of values less than a predetermined value (e.g., values of 0-100 which are less than a predetermined value of 101), and the values for the congestion metric may include a range of values greater than or equal to the predetermined value (e.g., values of 101-200 which are greater than or equal to the predetermined value of 101). In some aspects, each metric may comprise a range of a same or different number of values (e.g., the congestion metric values may include values of 101-150). The example of ranges used for the link utilization load metric and the congestion metric are provided for illustrative purposes only. Other values, ranges, scales, and units may be used to indicate the link utilization load metric and the congestion metric and their corresponding values.

The combination of the link utilization load metric and the congestion metric may be based on, e.g., a summation or product of determined values for each of the link utilization load metric and the congestion metric. The combination may also be based on a summation or product of a weighted value of the two numbers, i.e., where a first weight is assigned to the link utilization load metric and a second weight is assigned to the congestion metric. Each metric or combination of metrics may be compared to predetermined thresholds to determine whether data should be forwarded over a respective link. Examples of determining the combination of the link utilization metric and the congestion metric are provided below in relation to FIG. 2.

Thus, the described aspects can result in improved load balancing by allocating traffic based on a load metric which accounts for both link utilization and congestion. By factoring in the actual current (or relatively recent) utilization of links, the described aspects may achieve elimination of rapid increases and decreases in load, which can result in a significant reduction in the number of unnecessary and expensive rerouting operations to be performed.

FIG. 2 illustrates a diagram 200 of an exemplary load metric including a combination of a link utilization metric and a congestion metric, in accordance with an aspect of the present application. The described aspects of the finer granularity load metric can indicate a previously defined zero-load link based on both link utilization and congestion associated with the link. Diagram 200 depicts: a link utilization load metric (LULM) range 210 which includes values from "0" to "100"; and a congestion metric (CM) range 220 which includes values from "101" to "200." Each of ranges 210 and 220 may be marked off in 25-unit increments. A dark circle on each range can indicate a predetermined threshold for each range. For example, an element 212 may indicate a first predetermined threshold for the LULM at a value of "25," which can correspond to, e.g., a 25% utilization rate. An element 222 may indicate a second predetermined threshold for CM at a value of "115," which can correspond to, e.g., a depth of an output buffer indicating a certain rate of congestion. While two bordering ranges are illustrated in diagram 200 with 100 values for each range, these ranges and values are provided for illustrative purposes only. Other values may be used for identifying, marking, or computing the link utilization load metric and the congestion metric.

Diagram 200 can depict data to be used in determining a metric (i.e., "metric-determining") and comparing current measurements of load (including link utilization and congestion) with benchmarks or thresholds. An element 230 depicts sample values for a scenario. As described above, the first predetermined threshold (PDT) for the link utilization load metric (LULM) may have a value of "25," and the second predetermined threshold (PDT) for the congestion metric (CM) may have a value of "115." In the scenario depicted by element 230, a link may have a measured LULM value of "5" and a measured CM value of "106." These values may be determined by the system during operation, e.g., based on information measured by or communicated to a device associated with and monitoring the link. In addition, in the depicted scenario, a first weight X (for LULM) may be assigned a value of "5," and a second weight Y (for CM) may be assigned a value of "2." These assigned values may be configured by the system or an administrative user associated with the device or the network.

Diagram 200 also includes a table 240, which illustrates various conditions and combinations of the LULM and the CM resulting in determinations of whether a link is to be considered as a path for forwarding data (e.g., packets). Table 240 can include rows or entries, e.g., entries 250-260, which each indicate: a condition 242; an application/determination 244; and a result 246. The scenarios, ranges, values, thresholds, conditions, applications, and results illustrated and described in relation to FIG. 2 are provided for illustrative purposes only. Other measurements, conditions, values, and results may be possible.

Entry 250 indicates a condition that the LULM is less than the first predetermined threshold. Application of this condition may result in a determination of whether 5 is less than 25. Since this determination is true, the result can indicate a value of “TRUE.”

Similarly, entry 252 indicates a condition that the LULM is less than the first predetermined threshold and the CM is less than the second predetermined threshold. Application of this condition may result in a determination of whether 5 is less than 25 and 106 is less than 115. Since this determination true, the result can indicate a value of “TRUE.”

Entries 254, 256, 258, and 260 can indicate conditions based on a combination of the LULM and the CM. For example, entry 254 indicates a condition that the summation of the LULM and the CM is less than the summation of the first predetermined threshold and the second predetermined threshold. Application of this condition may result in a determination of whether 111 is less than 140. Since this determination is true, the result can indicate a value of “TRUE.”

As another example, entry 256 indicates a condition that a summation of a weighted value of the LULM (i.e., LULM multiplied or scaled by a first weight) and a weighted value of the CM (i.e., CM multiplied or scaled by a second weight) is less than a threshold (“a third predetermined threshold”). The third predetermined threshold may be one of, e.g.: a summation of the first predetermined threshold scaled by the first weight and the second predetermined threshold scaled by the second weight (e.g., a value of 355 as indicated by an element 262); a summation of the first predetermined threshold and the second predetermined threshold (e.g., a value of 140 as indicated by an element 264 and also as indicated by an element 261 in entry 254); and an other predetermined threshold (e.g., a value of 300 as indicated by an element 266).

The corresponding application of the condition with these three possible values for the third predetermined threshold may result in: a determination of whether 237 is less than 355 (the third predetermined threshold as indicated by element 262), which can yield a result with a value of “TRUE”; a determination of whether 237 is less than 140 (the third predetermined threshold as indicated by element 264), which can yield a result with a value of “FALSE”; and a determination of whether 237 is less than 300 (the third predetermined threshold as indicated by element 266), which can yield a result with a value of “TRUE.” Entry 256 depicts how the conditions and the values chosen for the assigned weights as well as the predetermined thresholds may impact the result of the application or determination.

As another example, entry 258 indicates a condition that the product of the LULM and the CM is less than the product of the first predetermined threshold and the second predetermined threshold. Application of this condition may result in a determination of whether 530 is less than 2,875. Since this determination is true, the result can indicate a value of “TRUE.”

As yet another example, entry 260 indicates a condition that the product of a weighted value of the LULM and a weighted value of the CM is less than the product of a similarly weighted value of the first predetermined threshold and a similarly weighted value of the second predetermined threshold. Application of this condition may result in a determination of whether 5,300 is less than 28,750. Since this determination is true, the result can indicate a value of “TRUE.”

The conditions used in entries 250-260 relating to scenario 230 are depicted as based on the same first and second predetermined thresholds and the same first and second weights. All values used in scenario 230 are provided for illustrative purposes only. As described above in relation to entry 256, in other scenarios, the predetermined threshold values (including the first, second, and third predetermined thresholds described above) and the assigned weights may be different and may be assigned or configured by the system or an administrative user associated with the system. Furthermore, other ranges, values for ranges, values, conditions, determinations, and results may be possible.

If a determination based on a condition for a link yields a result of “TRUE,” the system may forward data over the link. In some aspects, the system may add all links which yield a result of “TRUE” to a list or pool of links associated with a set of preferred paths over which to forward data. Furthermore, result 246 may be a binary value (e.g., “TRUE” or “FALSE,” as depicted in table 240) or may have multiple values. For example, the value for result 246 may be a range of values between “1” and “10” (with “1” indicating the lowest combined LULM and CM), where a predetermined threshold in the range defines whether a link is associated with the set of preferred paths. Thus, whether using binary or multiple values for result 246, the system can determine a set of preferred paths and select between the preferred paths. The value for result 246 may be set based on, e.g., a difference between a measured metric and a predetermined threshold.

A first link may include measured metrics that are closer to the predetermined thresholds than the measured metrics of a second link. For example, using the first predetermined threshold for LULM (which is “25”) and the second predetermined threshold for CM (which is “115”) in scenario 230, the predetermined threshold may be represented as a tuple: “[LULM PDT, CM PDT]=[25, 155].” The first link may include measured metrics of “[LULM, CM]=[24, 114],” while the second link may include measured metrics of “[LULM, CM]=[5, 108].” The system may determine that the difference between the measured metrics of the first link are closer to the predetermined thresholds than the measured metrics of the second link. As a result, the first link may be assigned a result value of “9” (indicating a high combined LULM and CM), while the second link may be assigned a result value of “2” (indicating a low combined LULM and CM). The system may assign any binary value or range of values to a link based on the conditions and determinations, and the system may add a link to the list or pool of links associated with the set of preferred paths over which to forward data. The links in the list or pool may be ordered based on the value of the corresponding result, e.g., ordered from lowest combined LULM and CM to highest combined LULM and CM.

Figure 3:
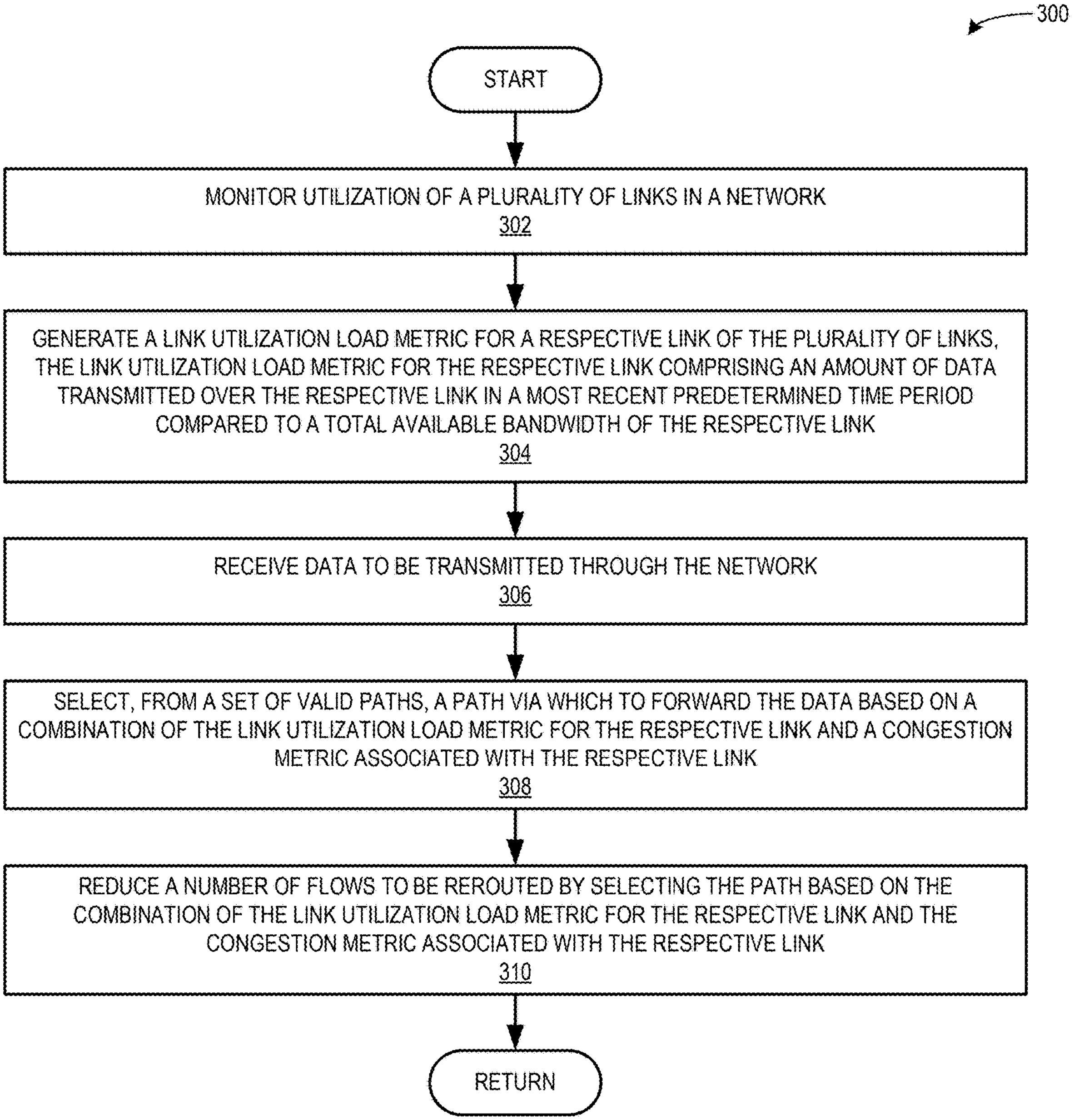
FIG. 3 presents a flowchart illustrating a method which facilitates the use of link utilization as a load metric, in accordance with an aspect of the present application.

FIG. 3 presents a flowchart 300 illustrating a method which facilitates the use of link utilization as a load metric, in accordance with an aspect of the present application. During operation, the system monitors utilization of a plurality of links in a network (operation 302). For example, switch 118 in FIG. 1 may monitor utilization of links 140, 142, and 144. Other switches in switch fabric 110 may also monitor utilization of links associated with a respective switch, e.g., switch 120 may monitor utilization of links 144, 146, and 148.

The system generates a link utilization load metric for a respective link of the plurality of links, the link utilization load metric for the respective link comprising an amount of data transmitted over the respective link in a most recent predetermined time period compared to a total available bandwidth of the respective link (operation 304). The link utilization load metric may be indicated by an amount of data transmitted over a respective link (e.g., link 140 monitored by switch 118 in system 110 of FIG. 1) in a most recent predetermined time period compared to a total available bandwidth of the link. For example, given a link with 100 Gbs of data transmitted over a recent time period or time interval of 10 seconds (i.e., at a rate of 10 Gbps) and a total available bandwidth for the link of 30 Gbps, the utilization of the link may be around 33% (i.e., 10 Gbps/30 Gbps). In addition, the system may generate a congestion metric associated with the link. For example, switch 118 may monitor, receive, and store information associated with congestion related to monitored link 140. The congestion metric may be based on a depth of an output queue (e.g., a number of packets in the output queue waiting to be sent) associated with the respective monitored link (e.g., link 140).

The system receives data to be transmitted or forwarded through the network (operation 306). The data may be received via a link monitored by a neighboring switch. For example, switch 120 may receive data via link 144 from one of its neighbor switches (e.g., switch 118, which monitors link 144), and the data may be transmitted or forwarded through the network by switch 120 via one of its monitored links 146 and 148. The data may also be received from an endpoint, processing node, device, or network coupled to switch fabric or network 110 via switch 120 (e.g., from IP/Ethernet network 134).

The system selects, from a set of valid paths, a path via which to forward the data based on a combination of the link utilization load metric for the respective link and a congestion metric associated with the respective link (operation 308). The system can select the path based on various conditions and determinations applied to the combination of the link utilization load metric and the congestion metric. The system can select the path further based on various thresholds used for comparison, e.g.: the first predetermined threshold for the link utilization load metric and the second predetermined threshold for the congestion metric (as indicated in scenario 230 of FIG. 2); and the third predetermined threshold (as indicated by elements 261-270 in table 240 of FIG. 2).

The system reduces a number of flows to be rerouted by selecting the path based on the combination of the link utilization load metric for the respective link and the congestion metric associated with the respective link (operation 310). As described above in relation to FIG. 2, as a result of applying the condition to the current measured LULM and CM and the given thresholds, the system can return various results for each link, including, e.g.: a binary result of "TRUE" or "FALSE"; and a value in a predefined range of values based on a difference between the current measured [LULM, CM] and the predetermined thresholds for [LULM PDT, CM PDT]. The system may select a link for forwarding when the result returns as "TRUE," or the system may add the link to a list or pool of possible links associated with preferred paths over which to forward data. The system may also select a link via which to forward data or add the link to a list of possible links via which to forward data based on the result returning a certain value in the predefined range of values. For example, in a range of values from "1" to "10," the certain value may be any assigned or determined result value less than "3." Such a certain value may indicate that the link is to be considered as a possible link for path selection.

Thus, by selecting a link corresponding to a load metric which is based on both link utilization and congestion, the system can decrease the possibility that forwarding data over a selected link may increase the load to the point that congestion may occur and rerouting may be necessary. By decreasing the number of rerouting operations to be performed, the system can achieve an improved load balancing, which can result in an increased performance and overall efficiency.

Figure 4:
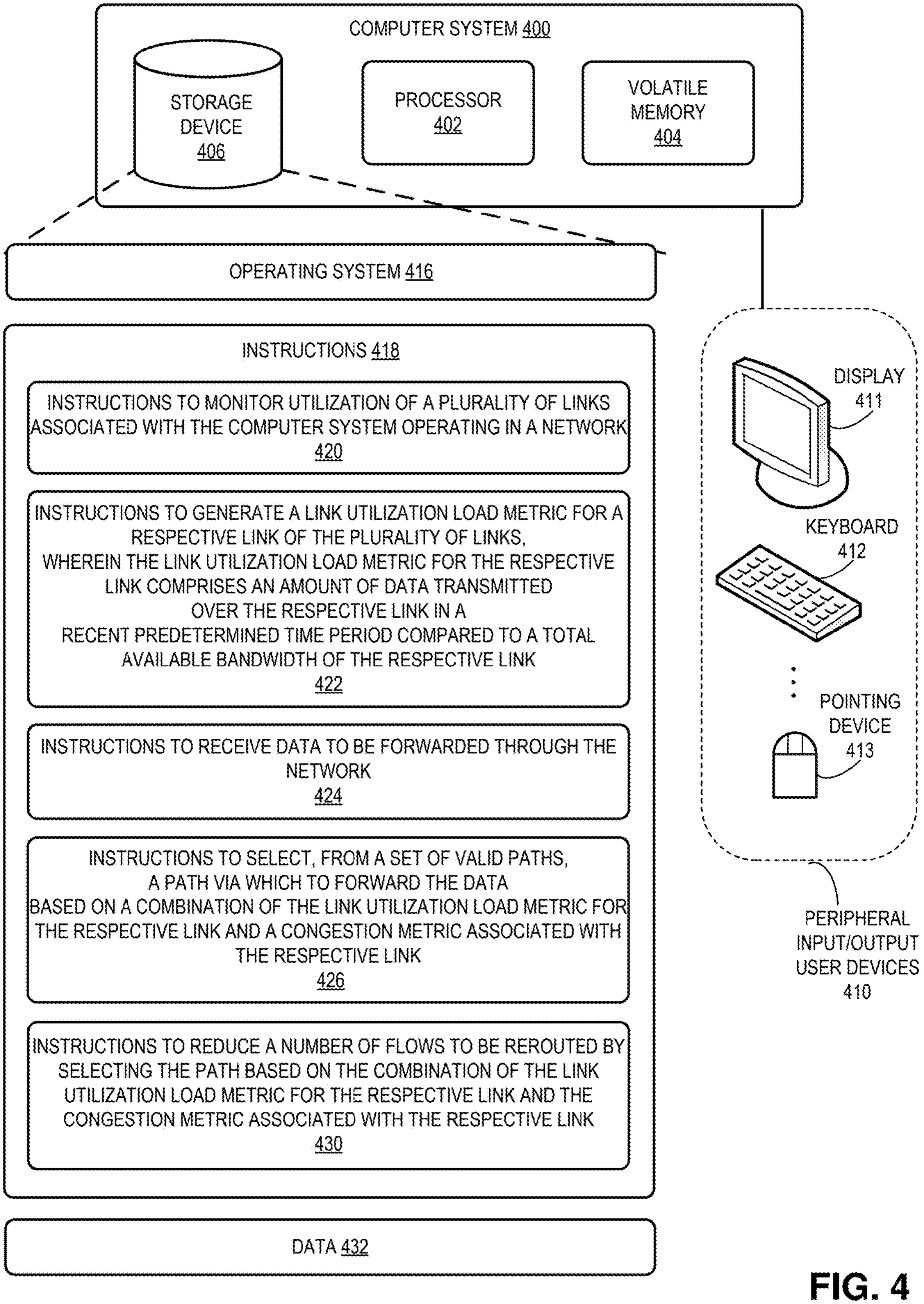
FIG. 4 illustrates a computer system which facilitates the use of link utilization as a load metric, in accordance with an aspect of the present application.

FIG. 4 illustrates a computer system 400 which facilitates the use of link utilization as a load metric, in accordance with an aspect of the present application. Computer system 400 includes a processor 402, a memory 404, and a storage device 406. Memory 404 may include a volatile memory (e.g., random access memory (RAM)) that serves as a managed memory and can be used to store one or more memory pools. Furthermore, computer system 400 may be coupled to peripheral I/O user devices 410 (e.g., a display device 411, a keyboard 412, and a pointing device 413). Storage device 406 includes non-transitory computer-readable storage medium and stores an operating system 416, instructions 418, and data 432. Computer system 400 may include fewer or more entities or instructions than those shown in FIG. 4.

Instructions 418 can include instructions, which when executed by computer system 400, can cause computer system 400 to perform methods and/or processes described in this disclosure. Specifically, instructions 418 may include instructions 420 to monitor utilization of a plurality of links associated with the computer system operating in the network, as described above in relation to switches 118 and 120 of FIG. 1 and operation 302 of FIG. 3.

Instructions 418 may include instructions 422 to generate a link utilization load metric for a respective link of the plurality of links, wherein the link utilization load metric for the respective link comprises an amount of data transmitted over the respective link in a recent predetermined time period compared to a total available bandwidth of the respective link. Generating the link utilization load metric is described above in relation to switch 118 of FIG. 1, the metric-determining of FIG. 2, and operation 304 of FIG. 3.

Instructions 418 may include instructions 424 to receive data to be forwarded through the network, as described above in relation to switch fabric or network 110 of FIG. 1 and operation 306 of FIG. 3.

Instructions 418 may include instructions 426 to select, from a set of valid paths, a path via which to forward the data based on a combination of the link utilization load metric for the respective link and a congestion metric associated with the respective link, as described above in relation to switch 118 of network 110 in FIG. 1 and operation 308 of FIG. 3.

Instructions 418 may include instructions 430 to reduce a number of flows to be rerouted by selecting the path based on the combination of the link utilization load metric for the respective link and the congestion metric associated with the respective link, as described above in relation to environment 100 of FIG. 1, scenario 230 and the metric-determining of FIG. 2, and operation 310 of FIG. 3.

Instructions 418 may include more instructions than those shown in FIG. 4. For example, instructions 418 may include instructions for executing the operations described above in relation to: the environment of FIG. 1; the metric-determining of FIG. 2; the operations depicted in the flowchart of FIG. 3; and the instructions of CRM 500 in FIG. 5.

Data 432 can include any data that is required as input or that is generated as output by the methods, operations, communications, and/or processes described in this disclosure. Specifically, data 432 can store at least: data; an indicator of a link and utilization of the link; an amount of data transmitted over a link in a period of time; a predetermined time period; a total available bandwidth of a link; an indicator of a set of valid paths; a selected path; a link utilization load metric (LULM); a congestion metric (CM); a combination of the LULM and the CM; a first, second, or third predetermined threshold; a range of values; a predetermined value; a summation; a product; a weight or factor; a weight assigned to the LULM or the CM; an indicator of a plurality of unordered packets, a new ordered flow, or a flow to be rerouted; a number of flows; a reduced number of flows; an indicator of a path; a list or pool of links or paths; an ordering or ranking of links or paths; a ranked order for a plurality of links or paths; a condition; and a result of an application or determination.

Figure 5:
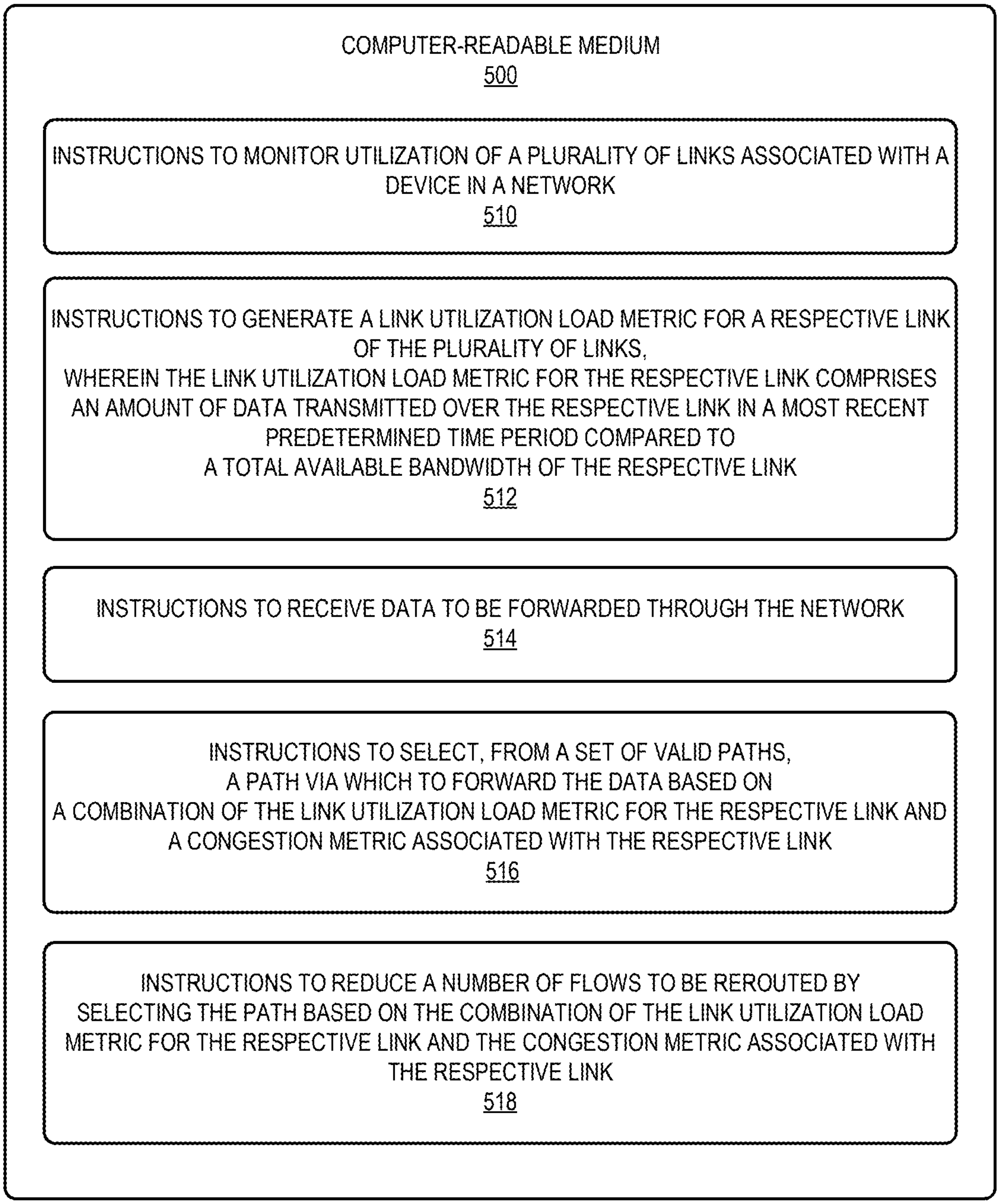
FIG. 5 illustrates a computer-readable medium which facilitates the use of link utilization as a load metric, in accordance with an aspect of the present application.

FIG. 5 illustrates a computer-readable medium 500 which facilitates the use of link utilization as a load metric, in accordance with an aspect of the present application. CRM 500 can be a non-transitory computer-readable medium or device storing instructions that when executed by a computer or processor cause the computer or processor to perform a method.

CRM 500 may store instructions 510 to monitor utilization of a plurality of links associated with a device in a network, wherein the link utilization load metric for the respective link comprises an amount of data transmitted over the respective link in a most recent predetermined time period compared to a total available bandwidth of the respective link, as described above in relation to switches 118 and 120 of FIG. 1 and operation 302 of FIG. 3. CRM 500 may store instructions 512 to generate a link utilization load metric for a respective link of the plurality of links, wherein the link utilization load metric for the respective link comprises an amount of data transmitted over the respective link in a most recent predetermined time period compared to a total available bandwidth of the respective link, as described above in relation to, e.g.: switch 118 of FIG. 1; the metric-determining, conditions, applications, and results of FIG. 2; and operation 304 of FIG. 3.

CRM 500 may also store instructions 514 to receive data to be forwarded through the network, as described above in relation to switch fabric or network 110 of FIG. 1 and operation 306 of FIG. 3. CRM 500 may store instructions 516 to select, from a set of valid paths, a path via which to forward the data based on a combination of the link utilization load metric for the respective link and a congestion metric associated with the respective link. Selecting from paths is described above in relation to switch 118 of network 110 in FIG. 1, and various ways in which to combine the link utilization load metric and the congestion metric are described above in relation to the metric-determining, conditions, applications, and results of FIG. 2.

CRM 500 may store instructions 518 to reduce a number of flows to be rerouted by selecting the path based on the combination of the link utilization load metric for the respective link and the congestion metric associated with the respective link, as described above in relation to environment 100 of FIG. 1, scenario 230 and the metric-determining of FIG. 2, and operation 310 of FIG. 3

CRM 500 may include more instructions than those shown in FIG. 5. For example, CRM 500 may also store instructions for executing the operations described above in relation to: the environment of FIG. 1; the metric-determining of FIG. 2; the operations depicted in the flowchart of FIG. 3; and instructions 418 of computer system 400 in FIG. 4.

The term "network device" refers to any device, component, or computing entity which can provide a communication pipeline for packets sent from a "processing node" or an "endpoint node." A processing or endpoint node can refer to a device, component, or hardware component which can operate as a source or a destination of data, including e.g., a control packet or a data packet. An example of a network device may be a switch, as described above in relation to FIG. 1.

In general, the disclosed aspects provide a method, a computer system, and a computer-readable medium which facilitate the use of link utilization as a load metric. During operation, the system monitors utilization of a plurality of links in a network. The system generates a link utilization load metric for a respective link of the plurality of links, the link utilization load metric for the respective link comprising an amount of data transmitted over the respective link in a most recent predetermined time period compared to a total available bandwidth of the respective link. The system receives data to be transmitted (i.e., forwarded) through the network. The system selects, from a set of valid paths, a path via which to forward the data based on a combination of the link utilization load metric for the respective link and a congestion metric associated with the respective link.

In a variation on this aspect, selecting the path is further based on the link utilization load metric being less than a first predetermined threshold.

In a further variation on this aspect, selecting the path is further based on the congestion metric being less than a second predetermined threshold.

In a further variation, the link utilization load metric comprises a first range of values less than a predetermined value, and the congestion metric comprises a second range of values greater than or equal to the predetermined value.

In a further variation, selecting the path is further based on the combination of the link utilization load metric and the congestion metric being less than a third predetermined threshold.

In a further variation, the combination is based on at least one of: a summation of the link utilization load metric and the congestion metric; a product of the link utilization load metric and the congestion metric; a first weight assigned to the link utilization load metric; or a second weight assigned to the congestion metric.

In a further variation, the data to be transmitted comprises a plurality of unordered packets.

In a further variation, the data to be transmitted comprises at least one of: a new ordered flow; or a flow to be rerouted.

In a further variation, the system reduces a number of flows to be rerouted by selecting the path based on the combination of the link utilization load metric for the respective link and the congestion metric associated with the respective link.

In another aspect, a computer system comprises a processor and a storage device storing instructions which when executed by the processor are to perform the following. The instructions are to monitor utilization of a plurality of links associated with the computer system operating in the network. The instructions are further to generate a link utilization load metric for a respective link of the plurality of links, wherein the link utilization load metric for the respective link comprises an amount of data transmitted over the respective link in a recent predetermined time period compared to a total available bandwidth of the respective link. The instructions are further to receive data to be forwarded through the network. The instructions are further to select, from a set of valid paths, a path via which to forward the data based on a combination of the link utilization load metric for the respective link and a congestion metric associated with the respective link. The computer system may further include instructions to perform the operations described herein, including in relation to: the environment of FIG. 1; the metric-determining of FIG. 2; the operations depicted in the flowchart of FIG. 3; and the instructions of CRM 500 in FIG. 5.

In another aspect, a non-transitory computer-readable storage medium (or CRM) stores instructions to monitor utilization of a plurality of links associated with a device in a network. The instructions are further to generate a link utilization load metric for a respective link of the plurality of links. The link utilization load metric for the respective link comprises an amount of data transmitted over the respective link in a most recent predetermined time period compared to a total available bandwidth of the respective link. The instructions are further to receive data to be forwarded through the network. The instructions are further to select, from a set of valid paths, a path via which to forward the data based on a combination of the link utilization load metric for the respective link and a congestion metric associated with the respective link. The CRM may also store instructions for executing the operations described above in relation to: the environment of FIG. 1; the metric-determining of FIG. 2; the operations depicted in the flowchart of FIG. 3; and instructions 418 of computer system 400 in FIG. 4.

The foregoing description is presented to enable any person skilled in the art to make and use the aspects and examples, and is provided in the context of a particular application and its requirements. Various modifications to the disclosed aspects will be readily apparent to those skilled in the art, and the general principles defined herein may be applied to other aspects and applications without departing from the spirit and scope of the present disclosure. Thus, the aspects described herein are not limited to the aspects shown, but are to be accorded the widest scope consistent with the principles and features disclosed herein.

Furthermore, the foregoing descriptions of aspects have been presented for purposes of illustration and description only. They are not intended to be exhaustive or to limit the aspects described herein to the forms disclosed. Accordingly, many modifications and variations will be apparent to practitioners skilled in the art. Additionally, the above disclosure is not intended to limit the aspects described herein. The scope of the aspects described herein is defined by the appended claims.

What is claimed is:

1. A method, comprising:

monitoring utilization of a plurality of links in a network;

generating a link utilization load metric for a respective link of the plurality of links, the link utilization load metric for the respective link comprising an amount of data transmitted over the respective link in a most recent predetermined time period compared to a total available bandwidth of the respective link;

receiving data to be transmitted through the network;

selecting, from a set of valid paths, a path via which to forward the data, the path corresponding to a load metric, based on a combination of the link utilization load metric for the respective link and a congestion metric associated with the respective link;

decreasing, based on the selected path which forwarding data over the selected link increases a load such that congestion and rerouting occur; and decreasing a number of rerouting operations to be performed and improving load balancing based on the selected path.

2. The method of claim 1, wherein selecting the path is further based on the link utilization load metric being less than a first predetermined threshold.

3. The method of claim 1, wherein selecting the path is further based on the link utilization load metric being less than a first predetermined threshold.

4. The method of claim 1, wherein the link utilization load metric comprises a first range of values less than a predetermined value, and wherein the congestion metric comprises a second range of values greater than or equal to the predetermined value.

5. The method of claim 1, wherein selecting the path is further based on the combination of the link utilization load metric and the congestion metric being less than a third predetermined threshold.

6. The method of claim 5, wherein the combination is based on at least one of:

a summation of the link utilization load metric and the congestion metric;

a product of the link utilization load metric and the congestion metric;

a first weight assigned to the link utilization load metric; or a second weight assigned to the congestion metric.

7. The method of claim 1, wherein the data to be transmitted comprises a plurality of unordered packets.

8. The method of claim 1, wherein the data to be transmitted comprises at least one of:

a new ordered flow; or a flow to be rerouted.

9. The method of claim 1, further comprising:

reducing a number of flows to be rerouted by selecting the path based on the combination of the link utilization load metric for the respective link and the congestion metric associated with the respective link.

10. A computer system operating in a network, the computer system comprising:

a processor; and a storage device storing instructions which when executed by the processor are to:

monitor utilization of a plurality of links associated with the computer system operating in the network;

generate a link utilization load metric for a respective link of the plurality of links, wherein the link utilization load metric for the respective link comprises an amount of data transmitted over the respective link in a recent predetermined time period compared to a total available bandwidth of the respective link;

receive data to be forwarded through the network;

select, from a set of valid paths, a path via which to forward the data, the path corresponding to a load metric, based on a combination of the link utilization load metric for the respective link and a congestion metric associated with the respective link:

decrease, based on the selected path which forwarding data over the selected link increases a load such that congestion and rerouting occur; and decrease a number of rerouting operations to be performed and improving load balancing based on the selected path.

11. The computer system of claim 10, wherein the instructions are further to:

select the path further based on at least one of:

the link utilization load metric being less than a first predetermined threshold; or the link utilization load metric being less than a first predetermined threshold and the congestion metric being less than a second predetermined threshold.

12. The computer system of claim 10, wherein the link utilization load metric comprises a first range of values less than a predetermined value, and wherein the congestion metric comprises a second range of values greater than or equal to the predetermined value.

13. The computer system of claim 10, wherein the instructions are further to:

select the path further based on the combination of the link utilization load metric and the congestion metric being less than a third predetermined threshold.

14. The computer system of claim 13, wherein the combination is based on at least one of: a summation of the link utilization load metric and the congestion metric;

a product of the link utilization load metric and the congestion metric;

a first weight assigned to the link utilization load metric; or a second weight assigned to the congestion metric.

15. The computer system of claim 10, wherein the data to be transmitted comprises at least one of:

a plurality of unordered packets;

a new ordered flow; or a flow to be rerouted.

16. The computer system of claim 10, wherein the instructions are further to:

reduce a number of flows to be rerouted by selecting the path based on the combination of the link utilization load metric for the respective link and the congestion metric associated with the respective link.

17. A non-transitory computer-readable medium storing instructions to:

monitor utilization of a plurality of links associated with a device in a network;

generate a link utilization load metric for a respective link of the plurality of links, wherein the link utilization load metric for the respective link comprises an amount of data transmitted over the respective link in a most recent predetermined time period compared to a total available bandwidth of the respective link;

receive data to be forwarded through the network;

select, from a set of valid paths, a path via which to forward the data, based on a combination of the link utilization load metric for the respective link and a congestion metric associated with the respective link;

decrease, based on the selected path which forwarding data over the selected link increases a load such that congestion and rerouting occur; and decrease a number of rerouting operations to be performed and improving load balancing based on the selected path.

18. The non-transitory computer-readable medium of claim 17, wherein selecting the path is further based on at least one of:

the link utilization load metric being less than a first predetermined threshold; or the link utilization load metric being less than a first predetermined threshold and the congestion metric being less than a second predetermined threshold.

19. The non-transitory computer-readable medium of claim 17, wherein the instructions are further to:

select the path further based on the combination of the link utilization load metric and the congestion metric being less than a third predetermined threshold, wherein the combination is based on at least one of:

a summation of the link utilization load metric and the congestion metric;

a product of the link utilization load metric and the congestion metric;

a first weight assigned to the link utilization load metric; or a second weight assigned to the congestion metric.

20. The non-transitory computer-readable medium of claim 17, wherein the instructions are further to:

reduce a number of flows to be rerouted by selecting the path based on the combination of the link utilization load metric for the respective link and the congestion metric associated with the respective link.

* * * * *